(12) United States Patent
Lee

(10) Patent No.: US 10,320,022 B2
(45) Date of Patent: Jun. 11, 2019

(54) MANUFACTURING DEVICE AND MANUFACTURING METHOD OF FUEL CELL COMPONENT

(71) Applicant: HYUNDAI MOTOR COMPANY, Seoul (KR)

(72) Inventor: Sun Ho Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 15/365,058

(22) Filed: Nov. 30, 2016

(65) Prior Publication Data

US 2017/0256810 A1   Sep. 7, 2017

(30) Foreign Application Priority Data

Mar. 4, 2016   (KR) .................. 10-2016-0026658

(51) Int. Cl.
| | | |
|---|---|---|
| *B32B 37/00* | (2006.01) | |
| *B32B 37/10* | (2006.01) | |
| *B32B 37/20* | (2006.01) | |
| *H01M 8/1004* | (2016.01) | |
| *H01M 8/1018* | (2016.01) | |
| *H01M 8/1086* | (2016.01) | |

(52) U.S. Cl.
CPC ....... *H01M 8/1093* (2013.01); *B32B 37/0053* (2013.01); *B32B 37/10* (2013.01); *B32B 37/20* (2013.01); *H01M 8/1004* (2013.01); *H01M 8/1018* (2013.01); *B32B 2307/20* (2013.01); *B32B 2457/18* (2013.01); *H01M 2008/1095* (2013.01); *Y02P 70/56* (2015.11)

(58) Field of Classification Search
CPC ............. H01M 8/1093; H01M 8/1004; H01M 8/1018; H01M 2008/1095; B32B 37/0053; B32B 37/10; B32B 37/20; B32B 2307/20; B32B 2457/18; Y02P 70/56
See application file for complete search history.

(56) References Cited

U.S. PATENT DOCUMENTS

2004/0241525 A1* 12/2004 Mekala ............... H01M 4/8828
 156/263
2007/0175584 A1* 8/2007 Merlo ................. H01M 4/8605
 156/308.2

FOREIGN PATENT DOCUMENTS

| JP | 2009-064634 A | 3/2009 |
|---|---|---|
| KR | 10-2006-0013556 A | 2/2006 |
| KR | 10-1575312 B1 | 12/2015 |

* cited by examiner

*Primary Examiner* — Gregg Cantelmo
(74) *Attorney, Agent, or Firm* — Brinks Gilson & Lione

(57) ABSTRACT

A manufacturing device of a fuel cell component includes an MEA unwinder on which a fabric panel is rolled. An MEA including an electrolyte membrane and an electrode is disposed on a protective film. The manufacturing device further includes a first hot roller disposed to press an upper sub-gasket supplied to a surface of an edge of the MEA from an upper sub-gasket unwinder, a protective film winder disposed behind the first hot roller and disposed to separate the protective film from the fabric panel, a second hot roller disposed to press the lower sub-gasket supplied to another surface of the edge of the MEA from the lower sub-gasket unwinder, and an MEA winder winding the MEA to which the upper sub-gasket and the lower sub-gasket are attached, in a roll shape.

7 Claims, 6 Drawing Sheets

Section A-A

Section C-C

Section D-D

Section E-E

MANUFACTURING DEVICE AND MANUFACTURING METHOD OF FUEL CELL COMPONENT

CROSS-REFERENCE TO RELATED APPLICATION

The application claims priority to and the benefit of Korean Patent Application No. 10-2016-0026658 filed in the Korean Intellectual Property Office on Mar. 4, 2016, the entire contents of which are incorporated herein by reference.

BACKGROUND (a) Field of the Disclosure

The present disclosure relates to a fuel cell and, more particularly, to a manufacturing device and a manufacturing method of a fuel cell component that continuously rolls and bonds a lower sub-gasket and an upper sub-gasket to an MEA that is supplied in a roll state.

(b) Description of the Related Art

A membrane-electrode assembly (MEA) that is a main component is positioned at the inmost side in a polymer electrolyte fuel cell and catalytic layers for an anode and a cathode are positioned at both sides of an electrolyte membrane as a center, which is called a 3-layer membrane-electrode assembly.

Further, a state when gas diffusion layers (GDLs) are further stacked outside the catalytic layers is called a 5-layer membrane-electrode assembly.

The membrane-electrode assembly further includes a sub-gasket other than the polymer electrolyte membrane and the catalytic layers (electrodes) positioned at both sides of the polymer electrolyte membrane, and the sub-gasket makes handling of the membrane-electrode assembly easy and is bonded thicker than the thicknesses of the catalytic layers (electrodes) in edge areas of both sides of the polymer electrolyte membrane, and polymer films such as inert PE and PEN are generally used.

When a separating plate having flow fields for supplying fuel to the outside of the gas diffusion layers of the membrane-electrode assembly configured as described above and discharging water produced by a reaction is stacked, it becomes one unit cell, and when a plurality of unit cells is stacked, it becomes a desired-sized fuel cell stack.

As methods of manufacturing the membrane-electrode assembly, there is a method of making a 5-layer membrane-electrode assembly through a CCG (Catalyst Coated on GDL) method that directly applies catalytic layers for an anode and a cathode to the gas diffusion layer and bonds them to a polymer electrolyte membrane, whereas there is a method of making a 3-layer membrane-electrode assembly through a CCM (Catalyst Coated on Membrane) method that directly applies catalytic layers for an anode and a cathode to a polymer electrolyte membrane.

According to the CCS (Catalyst Coated on Substrate) or the CCG (Catalyst Coated on GDL) method that directly applies catalytic layers on a gas diffusion layer, catalytic layers for an anode and a cathode are directly applied to a gas diffusion layer and then the catalytic layer and a polymer electrolyte membrane are bonded by thermal pressure bonding, whereby a 5-layer membrane-electrode assembly can be manufactured.

In contrast, according to the CCM (Catalyst Coated on Membrane) method that directly applied catalytic layers to a polymer electrolyte membrane, it is possible to manufacture a 3-layer membrane-electrode assembly by directly applying catalytic layers for an anode and a cathode to a polymer electrolyte membrane, but there is a need for a specific process of stacking a gas diffusion layer on the catalytic layers and bonding them by pressing.

That is, the CCM method requires a process of bonding a gas diffusion layer to catalytic layers when putting a 3-layer membrane-electrode assembly into a stack manufacturing process stacking a plurality of cells using automatic equipment after manufacturing the 3-layer membrane-electrode assembly in which catalytic layers are directly applied to a membrane-electrode assembly, that is, a polymer electrolyte membrane.

Meanwhile, a roll method of loading an MEA on a lower sub-gasket film, attaching an upper sub-gasket film to it, and pressing them may be applied, but productivity may be decreased by a process of loading a thin electrode membrane.

Further, a roll method of attaching and pressing a lower sub-gasket film and an upper sub-gasket film to the upper and lower sides of an electrode membrane film may be applied, but a loss of input of an electrolyte membrane is large, productivity is high though, so the manufacturing cost may be increased.

The Description of the Related Art is made to help understanding the background of the present invention and may include matters out of the related art known to those skilled in the art.

SUMMARY

The present disclosure has been made in an effort to provide a manufacturing device and a controlling method of a fuel cell component having advantages of being able to increase productivity by reducing a process of loading an electrode membrane and decrease the manufacturing cost by reducing a loss of an electrolyte membrane.

As described above, a manufacturing device of a fuel cell component according to an exemplary form of the present disclosure may include: an MEA unwinder on which a fabric panel, in which an MEA including an electrolyte membrane and an electrode is disposed on a protective film, is rolled; an upper sub-gasket unwinder on which an upper sub-gasket to be attached to a surface of the edge of the MEA is rolled; a first hot roller disposed to press the upper sub-gasket supplied to a surface of the edge of the MEA from the upper sub-gasket unwinder; a protective film winder disposed behind the first hot roller and disposed to separate the protective film from the fabric panel; a lower sub-gasket unwinder on which a lower sub-gasket to be attached to another surface of the edge of the MEA is rolled; a second hot roller disposed to press the lower sub-gasket supplied to another surface of the edge of the MEA from the lower sub-gasket unwinder; and an MEA winder winding the MEA to which the upper sub-gasket and the lower sub-gasket are attached, in a roll shape.

The device may further include: an electrolyte membrane roll cutter disposed behind the MEA unwinder and disposed to cut an edge area of the electrolyte membrane from a fabric panel supplied from the MEA unwinder; and a scrap winder restoring an electrolyte membrane scrap cut by the electrolyte membrane roll cutter in a roll shape.

The MEA may include: a polymer electrolyte membrane; and electrode membranes formed at center portions of a surface and another surface of the electrolyte membrane, and the protective film may be disposed on the exterior surface of one of the electrode membranes.

The electrolyte membrane roll cutter may cut a preset area of the edge of the electrolyte membrane except the electrode membranes.

The upper sub-gasket may be pressed to the exterior surface of the edge of one of the electrode membranes and a surface of the electrolyte membrane, and the lower sub-gasket may be pressed to the exterior surface of another one of the electrode membranes, another surface of the electrolyte membrane, and the upper sub-gasket.

The device may further include a feeding conveyer disposed behind the electrolyte membrane roll cutter and moving the fabric panel from the MEA unwinder to the MEA rewinder.

Roll cutters for roll-cutting the upper sub-gasket and the lower sub-gasket in preset shapes may be disposed behind the upper sub-gasket unwinder and the lower sub-gasket unwinder, respectively.

According to another exemplary form of the present disclosure, a manufacturing method of a fuel cell component may include: supplying a fabric panel in which an MEA is formed on a protective film; roll-cutting a preset area of the edge of the electrolyte membrane of the MEA and removing a cut scrap; attaching an upper sub-gasket to the electrolyte membrane, on an opposite side to the protective film, and pressing the upper sub-gasket at a preset temperature; removing the protective film after the upper sub-gasket is pressed; and attaching a lower sub-gasket to correspond to the upper sub-gasket after the protective film is removed, and pressing the lower sub-gasket at a preset temperature.

In the supplying of a fabric panel, the fabric panel wound on an MEA unwinder in a roll shape may be unwound and supplied.

The upper sub-gasket and the lower sub-gasket may be pressed using a hot roller.

In order to attach the upper sub-gasket and the lower sub-gasket to the electrolyte membrane, the upper sub-gasket wound on an upper sub-gasket unwinder in a roll shape may be unwound and supplied, and the lower sub-gasket wound on a lower sub-gasket unwinder in a roll shape may be unwound and supplied.

The upper sub-gasket supplied from the upper sub-gasket unwinder and the lower sub-gasket supplied from the lower sub-gasket unwinder may be cut in preset shapes using roll cutters, respectively.

An edge area of the electrolyte membrane may be roll-cut using a roll cutter, and a scrap of the electrolyte membrane may be wound and stored in a roll shape using a scrap winder.

The MEA may include: a polymer electrolyte membrane; and electrode membranes formed at center portions of a surface and another surface of the electrolyte membrane, and the protective film may be disposed on the exterior surface of one of the electrode membranes.

The upper sub-gasket may be pressed to the exterior surface of the edge of one of the electrode membranes and a surface of the electrolyte membrane, and the lower sub-gasket may be pressed to the exterior surface of another one of the electrode membranes, another surface of the electrolyte membrane, and the upper sub-gasket.

In forms of the present disclosure, an MEA fabric panel is continuously supplied in a state when an electrode membrane (MEA) is attached on a protective film, so a process of loading an MEA is removed, and accordingly, productivity can be increased.

Further, a loss of a scrap formed on an electrolyte membrane is minimized and restored, so that the manufacturing cost can be reduced, and production efficiency can be improved by bonding an MEA to an upper sub-gasket and a lower sub-gasket through a roll-to-roll process.

DETAILED DESCRIPTION

Figure 1:
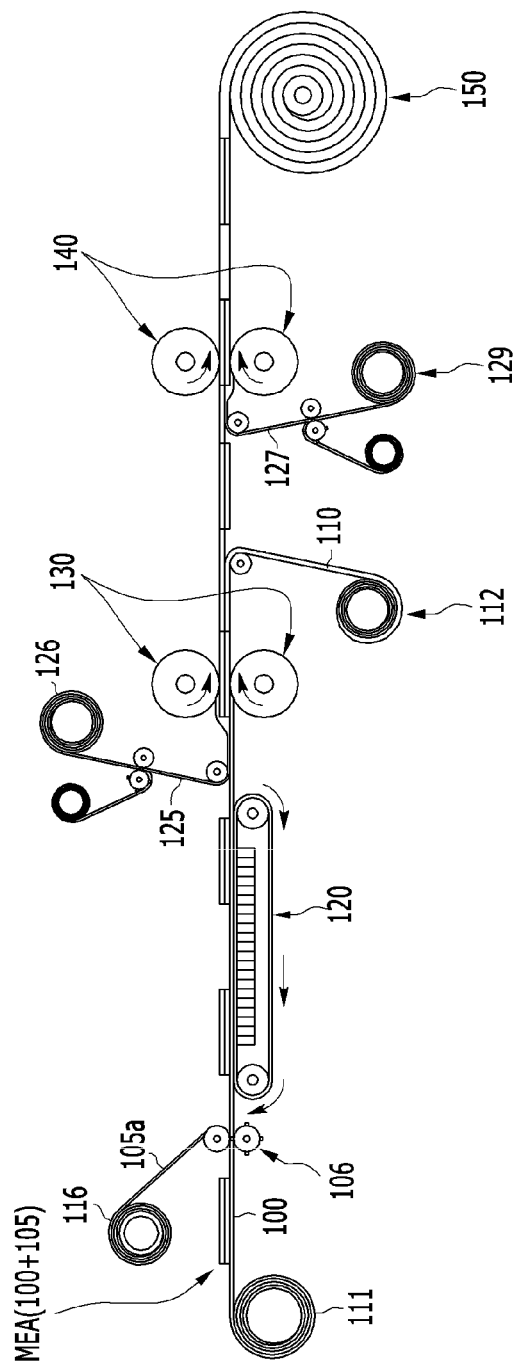
FIG. 1 is a schematic configuration diagram showing a manufacturing device of a fuel cell component.

Hereinafter, exemplary forms of the present disclosure will be described in detail with reference to the accompanying drawings.

The sizes and thicknesses of the configurations shown in the drawings are provided selectively for the convenience of description, such that the present disclosure is not limited to those shown in the drawings and the thicknesses are exaggerated to make some parts and regions clear.

The unrelated parts to the description of the exemplary forms are not shown to make the description clear and like reference numerals designate like elements throughout the specification.

Using the terms of the first and the second, and upper and lower etc. is for discriminating the components having the same name and they are not limited to the orders and positions.

FIG. 1 is a schematic configuration diagram showing a manufacturing device of a fuel cell component.

Referring to FIG. 1, a manufacturing device of a fuel cell component includes an MEA unwinder 111, an electrolyte membrane roll cutter 106, a scrap winder 116, an electrode membrane 100, an electrolyte membrane 105, a protective film 110, an electrolyte membrane scrap 105a, a feeding conveyer 120, an upper sub-gasket 125, an upper sub-gasket unwinder 126, a first hot roller 130, a protective film winder 112, a lower sub-gasket 127, a lower sub-gasket unwinder 129, a second hot roller 140, and an MEA winder 150.

Figure 2:
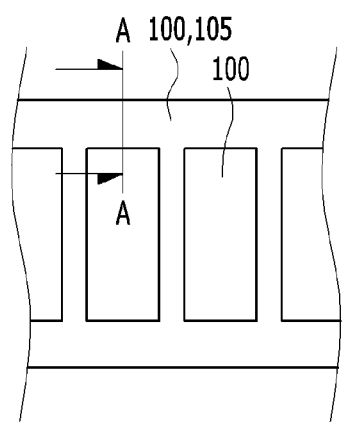
FIG. 2 is a cross-sectional view showing a state when an MEA is attached to a protective film in a fuel cell component.
Figure 2:
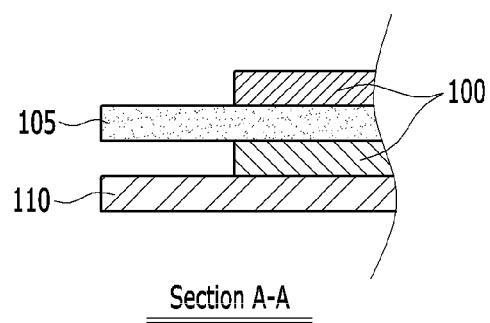

An MEA is attached on the protective film 110 and the MEA includes the electrolyte membrane 105 and the electrode membrane 100. Refer to FIG. 2 for the detailed structure.

An MEA fabric panel in which the MEA is attached to the protective film 110 is wound in a roll shape on the MEA unwinder 111 and the MEA unwinder 111 continuously supplies the fabric panel in the flow direction of a process.

The electrolyte membrane roll cutter 106 is disposed behind the MEA unwinder 111, the electrolyte membrane roll cutter 106 cuts a preset edge area of the electrolyte membrane 105 formed on the MEA, and the cut electrolyte membrane scrap 105a is wound in a roll shape and restored on the scrap winder 116.

Figure 3:
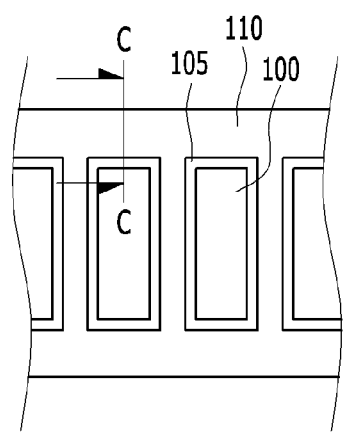
FIG. 3 is a cross-sectional view showing a state when an MEA is attached to a protective film and an electrolyte membrane is cut in a fuel cell component.
Figure 3:
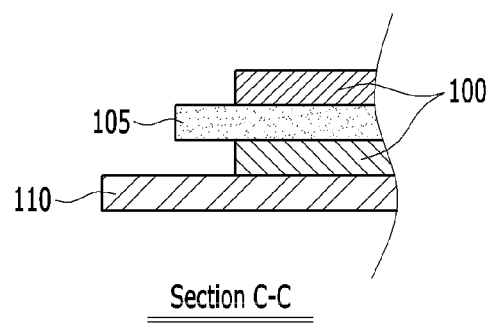

The feeding conveyer 120 is disposed behind the electrolyte membrane roll cutter 106. Refer to FIG. 3 for the MEA fabric panel passing the feeding conveyer 120.

The first hot roller 130 is disposed behind the feeding conveyer 120 and the upper sub-gasket 125 is additionally supplied ahead of the first hot roller 130.

The upper sub-gasket 125 is wound in a roll shape on the upper sub-gasket unwinder 126, the upper sub-gasket unwinder 126 continuously supplies the upper sub-gasket 125 to an inlet of the first hot roller 130, and the upper sub-gasket roll cutter (reference number is not shown) roll-cuts the upper sub-gasket 125 in a preset shape.

The roll-cut upper sub-gasket 125 is attached to an opposite upper surface of the protective film 110 in the MEA fabric panel.

Figure 4:
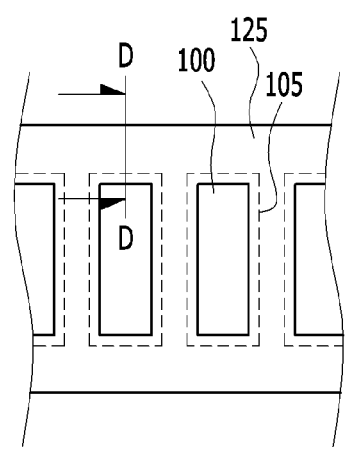
FIG. 4 is a cross-sectional view showing a state when a protective film is removed and an upper sub-gasket is attached to an MEA in a fuel cell component.
Figure 4:
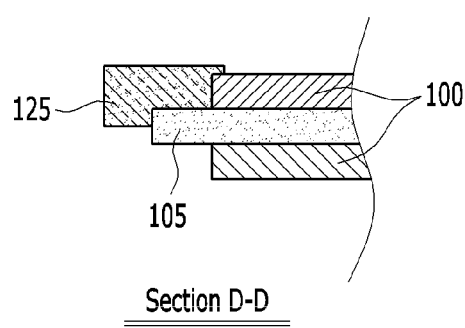

The first hot roller 130 presses the upper sub-brackets 125 to the MEA at a preset temperature. Refer to FIG. 4 for the state when the upper sub-gasket 125 is pressed on the upper surface of the MEA.

Further, the protective film winder 112 takes off the protective film 110 from the MEA fabric panel and winds it in a roll shape behind the first hot roller 130.

The lower sub-gasket 127 is wound in a roll shape on the lower sub-gasket unwinder 129 and the lower sub-gasket unwinder 129 continuously supplies the lower sub-gasket 127 to the lower surface of the MEA fabric panel in order to attach the lower sub-gasket 127 to the lower surface of the MEA fabric panel from which the protective film 110 is separated.

Further, the lower sub-gasket roll cutter (reference numeral is not shown) roll-cuts the lower sub-gasket 127 in a preset shape and supplies it to an inlet of the second hot roller 140.

Figure 5:
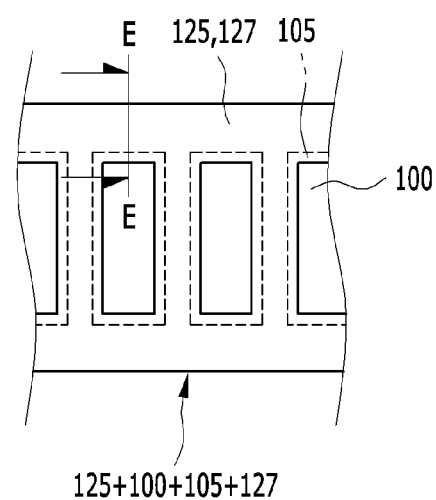
FIG. 5 is a cross-sectional view showing a state when an upper sub-gasket and a lower sub-gasket are attached to an MEA in a fuel cell component.
Figure 5:
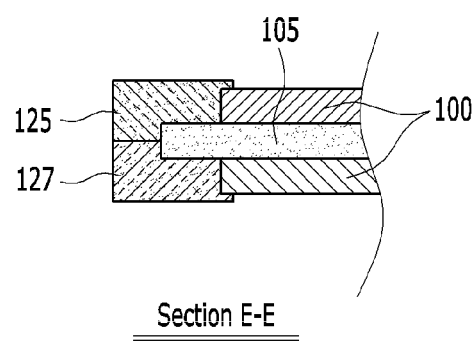

Further, the second hot roller 140 presses the lower sub-gasket 127 to the MEA fabric panel at a preset temperature. Refer to FIG. 5 for the state when the lower sub-gasket 127 is pressed on the lower surface of the MEA.

The MEA winder 150 winds the MEA to which the upper sub-gasket 125 and the lower sub-gasket 127 are attached and stores it in a roll shape.

FIG. 2 is a cross-sectional view showing a state when an MEA is attached to a protective film in a fuel cell component.

Referring to FIG. 2, an MEA is attached on the protective film 110 and the MEA includes the electrolyte membrane 105 and the electrode membrane 100.

The electrode membranes 100 are arranged with preset intervals (or with space) on the protective film 110, the electrolyte membrane 105 is continuously formed thereon, and other electrode membranes are formed with preset intervals on the electrolyte membrane 105.

Accordingly, the electrolyte membranes 100 are formed at the center portions of a surface and another surface of the electrolyte membrane 105 and the edge of the electrolyte membrane 105 extends to a side to have a protruding structure.

Further, the protective film 110 is attached to the lower surfaces of the electrode membranes 100 disposed on the lower surface. As shown, the protective film 110 and the electrolyte membrane 105 are formed in the same area.

FIG. 3 is a cross-sectional view showing a state when an MEA is attached to a protective film and an electrolyte membrane is cut in a fuel cell component.

Referring to FIG. 3, the protruding length of the electrolyte membrane 105 is shortened by cutting and removing an edge end of the electrolyte membrane 105. Herein, the electrolyte membrane 105 is cut by the electrolyte membrane roll cutter 106, separated by the scrap winder 116, and restored in a roll shape.

FIG. 4 is a cross-sectional view showing a state when a protective film is removed and an upper sub-gasket is attached to an MEA in a fuel cell component.

Referring to FIG. 4, in a state when the protective film 110 is removed, the upper sub-gasket 125 is bonded to the exterior surface edges and sides of the electrode membranes 100 disposed at the upper portion and the upper surface of the electrolyte membrane 105.

FIG. 5 is a cross-sectional view showing a state when an upper gasket and a lower sub-gasket are attached to an MEA in a fuel cell component.

Referring to FIG. 5, in a state when the upper sub-gasket 125 is attached to the upper surface of the edges, the lower sub-gasket 127 is bonded to the exterior surface edges and sides of the electrode membranes 100 disposed at the lower portion and the lower surface of the electrolyte membrane 105, and the lower sub-gasket 127 is bonded to the upper sub-gasket 125.

Figure 6:
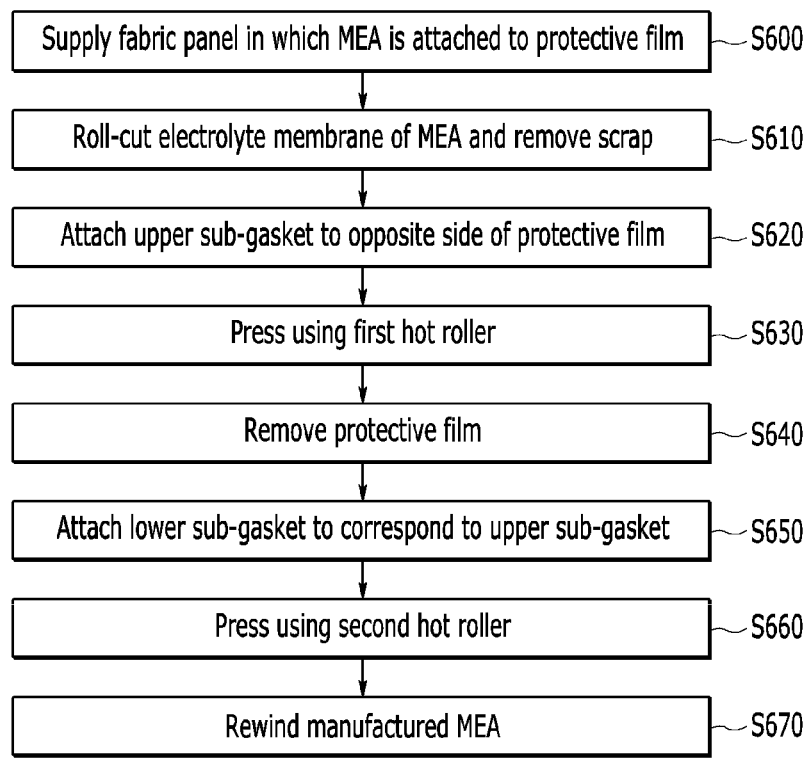
FIG. 6 is a flowchart showing a manufacturing method of a fuel cell component.

FIG. 6 is a flowchart showing a manufacturing method of a fuel cell component.

Referring to FIG. 6, according to a manufacturing method of a fuel cell component, in S600, the MEA unwinder 111 continuously supplies a fabric panel in which the MEA is attached to the protective film 110.

In S610, the electrolyte membrane roll cutter 106 cuts a preset area of the edge of the electrolyte membrane 105 from the fabric panel and the scrap winder 116 separates the cut scrap from the fabric panel by pulling it and stores it in a roll shape.

In S620, the upper sub-gasket unwinder 126 supplies the upper sub-gasket 125 to the upper surface of the fabric panel, the sub-gasket roll cutter cuts and removes an unnecessary portion, and the upper sub-gasket 125 of which the unnecessary portion is removed is attached to the upper surface of the fabric panel.

Further, in S630, the first hot roller 130 presses the upper sub-gasket 125 to the upper surface of the fabric panel. Here, the upper sub-gasket 125 is attached to the edge of a surface of the electrode membrane 100, and the upper surface of the electrolyte membrane 105.

In S640, the protective film winder 112 separates the protective film 110 attached to the lower portion of the fabric panel by pulling it and stores it in a roll shape.

In S650, the lower sub-gasket unwinder 129 supplies the lower sub-gasket 127 to the lower surface of the fabric panel, the sub-gasket roll cutter cuts and removes an unnecessary portion, and the lower sub-gasket 127 of which the unnecessary portion is removed is attached to the lower surface of the fabric panel.

Further, in S660, the second hot roller 140 presses the lower sub-gasket 127 to the lower surface of the fabric panel. Here, the lower sub-gasket 127 is attached to the edge of a surface of the electrode membrane 100 and the lower surface of the electrolyte membrane 105, and is also bonded to the upper sub-gasket 125.

Further, in S670, the MEA winder 150 winds and stores in a roll shape the MEA to which the upper sub-gasket 125 and the lower sub-gasket 127 are attached.

While this disclosure has been described in connection with what is presently considered to be practical exemplary forms, it is to be understood that the disclosure is not limited to the disclosed forms, but, on the contrary, is intended to cover various modifications and equivalent arrangements included within the spirit and scope of the appended claims.

DESCRIPTION OF SYMBOLS

100: electrode membrane 111: MEA unwinder
106: electrolyte membrane roll cutter 116: scrap winder
105a: electrolyte membrane scrap 120: feeding conveyer
125: upper sub-gasket 126: upper sub-gasket unwinder
112: protective film winder 130: first hot roller
127: lower sub-gasket 129: lower sub-gasket unwinder
140: second hot roller 150: MEA winder

What is claimed is:

1. A manufacturing device of a fuel cell component, comprising:
    a membrane electrode assembly (MEA) unwinder on which a fabric panel, in which an MEA including an electrolyte membrane and an electrode is disposed on a protective film, is rolled;
    an upper sub-gasket unwinder on which an upper sub-gasket to be attached to a surface of an edge of the MEA is rolled;
    a first hot roller disposed to press the upper sub-gasket supplied to a surface of the edge of the MEA from the upper sub-gasket unwinder;
    a protective film winder disposed behind the first hot roller and disposed to separate the protective film from the fabric panel;
    a lower sub-gasket unwinder on which a lower sub-gasket to be attached to another surface of the edge of the MEA is rolled;
    a second hot roller disposed to press the lower sub-gasket supplied to another surface of the edge of the MEA from the lower sub-gasket unwinder; and
    an MEA winder winding the MEA to which the upper sub-gasket and the lower sub-gasket are attached, in a roll shape.

2. The device of claim 1, further comprising:
    an electrolyte membrane roll cutter disposed behind the MEA unwinder and disposed to cut an edge area of the electrolyte membrane from a fabric panel supplied from the MEA unwinder; and
    a scrap winder restoring an electrolyte membrane scrap cut by the electrolyte membrane roll cutter in a roll shape.

3. The device of claim 2, wherein: the MEA includes:
    a polymer electrolyte membrane; and
    electrode membranes formed at center portions of a surface and another surface of the electrolyte membrane, and the protective film is disposed on an exterior surface of one of the electrode membranes.

4. The device of claim 2, wherein: the electrolyte membrane roll cutter cuts a preset area of the edge of the electrolyte membrane except the electrode membranes.

5. The device of claim 3, wherein: the upper sub-gasket is pressed to an exterior surface of the edge of one of the electrode membranes and a surface of the electrolyte membrane, and the lower sub-gasket is pressed to an exterior surface of the edge of another one of the electrode membranes, another surface of the electrolyte membrane, and the upper sub-gasket.

6. The device of claim 3, further comprising:
    a feeding conveyer disposed behind the electrolyte membrane roll cutter and moving the fabric panel from the MEA unwinder to a MEA rewinder.

7. The device of claim 3, wherein: roll cutters for roll-cutting the upper sub-gasket and the lower sub-gasket in preset shapes are disposed behind the upper sub-gasket unwinder and the lower sub-gasket unwinder, respectively.

* * * * *